US007057325B2

(12) United States Patent
Friebe

(10) Patent No.: US 7,057,325 B2
(45) Date of Patent: Jun. 6, 2006

(54) CARBON SEGMENT COMMUTATOR

(75) Inventor: Joachim Friebe, Weinstadt (DE)

(73) Assignee: Johnson Electric S.A., LaChaux-de-Fonds (CH)

(*) Notice: Subject to any disclaimer, the term of this patent is extended or adjusted under 35 U.S.C. 154(b) by 0 days.

(21) Appl. No.: 10/926,020

(22) Filed: Aug. 26, 2004

(65) Prior Publication Data

US 2005/0046301 A1 Mar. 3, 2005

(30) Foreign Application Priority Data

Aug. 27, 2003 (GB) ................................ 0319978.3

(51) Int. Cl.
*H02K 13/04* (2006.01)
*H01R 39/06* (2006.01)

(52) U.S. Cl. ...................................... 310/237; 310/234

(58) Field of Classification Search ................ 310/233, 310/234, 235, 237
See application file for complete search history.

(56) References Cited

U.S. PATENT DOCUMENTS 3,459,983 A * 8/1969 Bowcott ..................... 310/234
4,584,498 A * 4/1986 Strobl ........................ 310/236
5,386,167 A * 1/1995 Strobi ........................ 310/237
5,679,996 A * 10/1997 Strobl ........................ 310/237
5,910,259 A 6/1999 Warner
2002/0117930 A1* 8/2002 Strobl ........................ 310/233
2003/0020360 A1 1/2003 Luedtke

FOREIGN PATENT DOCUMENTS

EP 0 529 911 A2 3/1993
EP 1 237 235 A2 9/2002
EP 1237235 A3 4/2003

* cited by examiner

*Primary Examiner*—Tran Nguyen
(74) *Attorney, Agent, or Firm*—Birch Stewart Kolasch & Birch LLP

(57) ABSTRACT

A commutator comprises a plurality of commutator terminals each having a contact part 12 and a separate terminal part 13, first and second supports 10 and 11, respectively, of insulating material for supporting the contact parts and the terminal parts, respectively, and a plurality of carbon segments 14 formed on the first support 10 and over the contact parts 12, respectively, of the terminals. The terminal parts 13 each comprise a first portion 24 to which armature winding wire of a motor can be connected by a thermal connection process and a second portion 25 for making a mechanical connection with a respective contact part.

12 Claims, 3 Drawing Sheets

CARBON SEGMENT COMMUTATOR

CROSS REFERENCE TO RELATED APPLICATIONS

This application claims priority under 35 USC § 119 from patent application no. 0319978.3 filed in Great Britain on 27 Aug. 2003.

FIELD OF THE INVENTION

This invention relates to a carbon segment commutator for an electric motor.

BACKGROUND OF THE INVENTION

There are two main methods of connecting the armature winding to the commutator segments of electric motors. One is to provide a mechanical connection. The other is to connect the winding wire to a tang using a thermal connection process such as a fusing process. Carbon segment commutators are becoming more commonly used. These comprise a commutator base of insulating material, a plurality of commutator terminals, each of which comprises a terminal portion and a contact portion, and a plurality of carbon segments formed on the base and over the contact portions, respectively, of the terminals. The heat generated by fusing the winding wire to the terminal portions of the commutator terminals is necessarily high in order to burn off the wire insulation and this heat will be transferred to the connection between the graphite and the metal contact portion with consequent risk of damage to this connection. On the other hand mechanical connections which rely on locating the winding wire into narrow slots in the terminal portions of the commutator terminals require a range of different commutator terminals to connect to the different wire diameters used and this requires different tooling and bears the risk of mixing the components.

The present invention seeks to overcome these drawbacks.

SUMMARY OF THE INVENTION

According to a first aspect of the present invention there is provided a commutator comprising a plurality of commutator terminals each having a contact part and a separate terminal part, first and second supports of insulating material for supporting the contact parts and the terminal parts, respectively, and a plurality of carbon segments formed on the first support and over the contact parts, respectively, of the terminals, the terminal parts each comprising a first portion to which armature winding wire of a motor can be connected by a thermal connection process and a second portion for making a mechanical connection with a respective contact part.

It is thus possible to connect the armature winding to the terminal parts of the commutator terminals by a thermal connection process such as a fusing process before connecting the terminal parts to the contact parts of the commutator terminals. This therefore prevents any heat generated by the thermal connection process from damaging the connection between the graphite and the contact portions.

Preferably, the second portion of each terminal part has at least one elongate slot for slidably receiving a portion of a respective contact part. In this case, the second portion of each terminal part may be of inverted channel-shape with two sides and top, the top having a transverse slot merging at opposite ends with open ends of elongate slots extending away from the top and along the two sides so that the said portion of a respective contact part can be slidably inserted into the slots in the two sides of the second portion of the terminal part. The elongate edges of the slots, advantageously, have inward projections, e.g. barbs, for gripping the said portion of a respective contact part.

Preferably, the second support is in the form of a housing, such as a crown, having a plurality of housing recesses for receiving the second portions of the terminal parts, respectively. In this case, the second portions of the terminal parts may have outward projections, e.g. barbs, for gripping the walls of the recesses.

Preferably, the first portions of the terminal parts are in the form of hook-shaped tangs connected to respective second portions by intermediate portions. In this case the intermediate portions, at least in part, may lie against an outer peripheral surface of the housing.

Preferably, recesses are provided in the housing behind the hook-shaped tangs so that the supporting stem of high temperature resistivity can be placed in the recess during magnet wire fusing.

The commutator may be in the form of a planar commutator having a planar commutating surface. In this case, the first support may be in the form of a commutator base of insulating material, the base having a rotational axis and front and rear surfaces extending, at least in part, transversely to the rotational axis, and the contact parts may extend through respective apertures in the base and be bent over to lie against, or in close proximity to, the front surface of the base. In this case, rearwardly extending portions of the contact parts make the mechanical connection with respective terminal parts. The commutator base may have posts projecting from its rear surface to fit in the recesses behind the hook-shaped tangs on the housing.

According to a second aspect of the present invention, there is provided a method of assembling a commutator according to the first aspect of the invention, wherein the armature winding wire is connected to the first portions of the terminal parts by a thermal connection process, e.g. a fusing process, prior to connecting the terminal parts to the contact parts.

The invention will now be more particularly described, by way of example only, with reference to the accompanying drawings.

DETAILED DESCRIPTION OF THE PREFERRED EMBODIMENT

Figure 1:
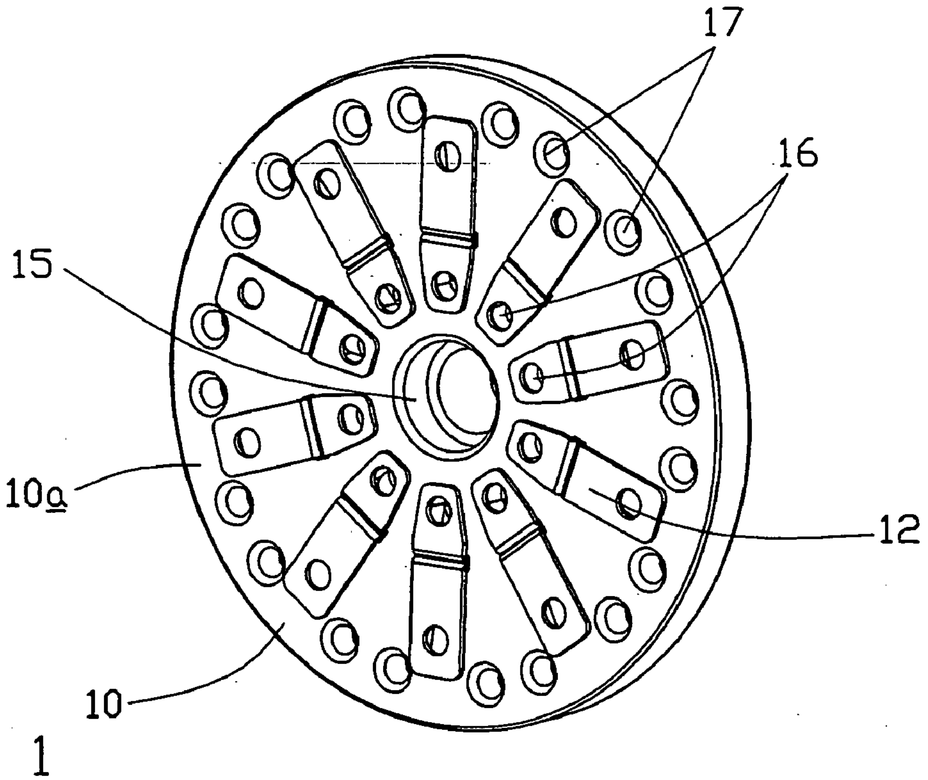
FIG. 1 is a perspective view from the front of a first part of a commutator according to the present invention.
Figure 2:
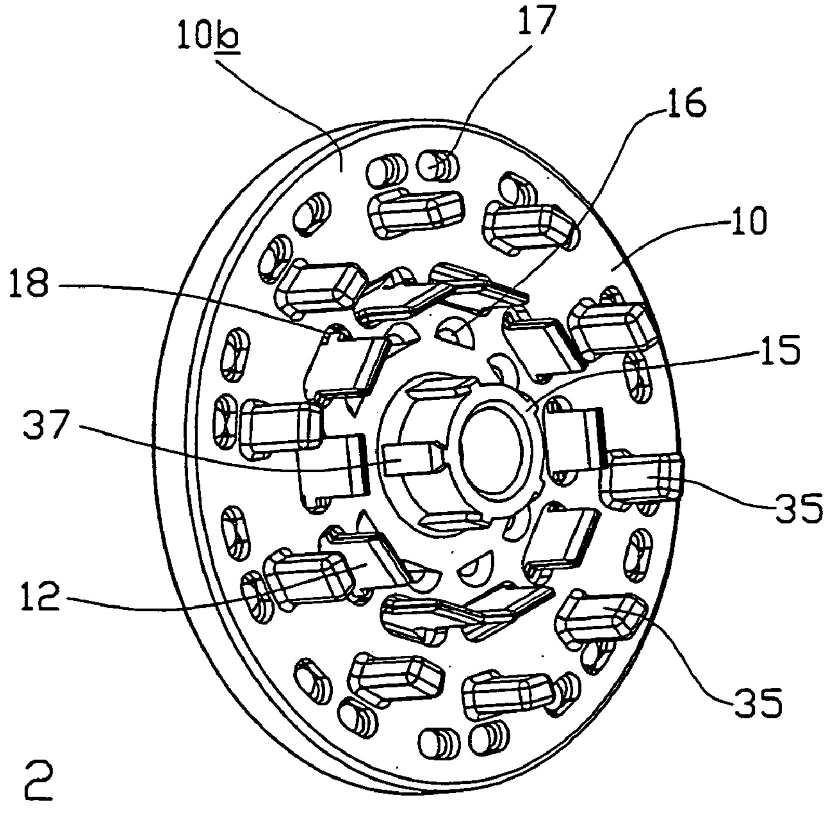
FIG. 2 is a perspective view from the rear of the part shown in FIG. 1.
Figure 3:
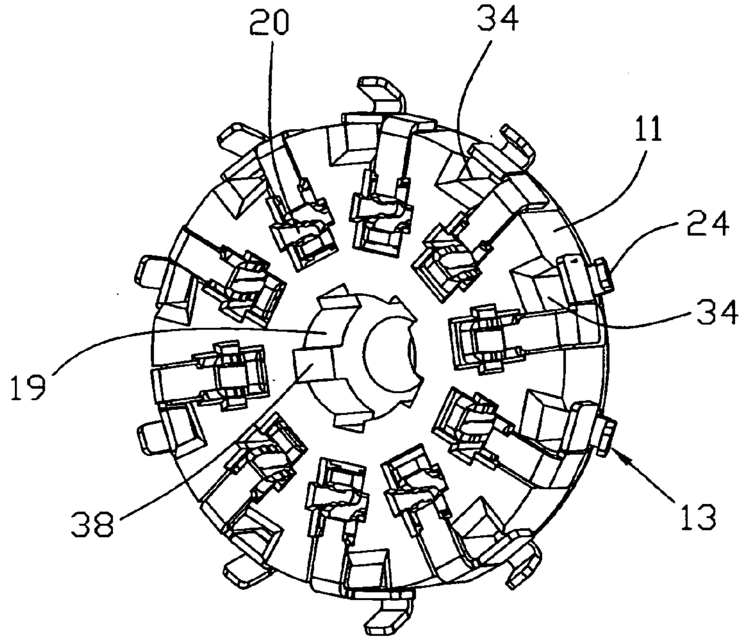
FIG. 3 is a perspective view from the front of a second part of a commutator according to the present invention.
Figure 4:
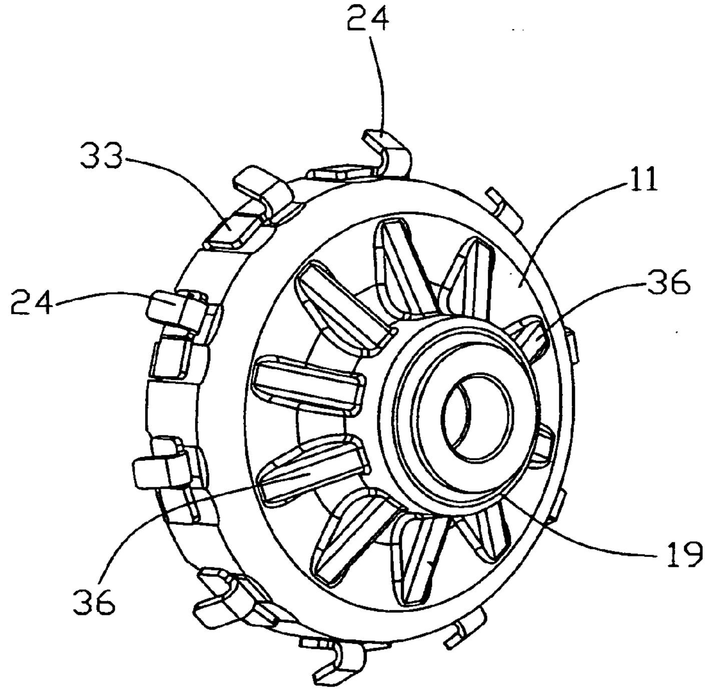
FIG. 4 is a perspective view from the rear of the second part of the commutator.
Figure 5:
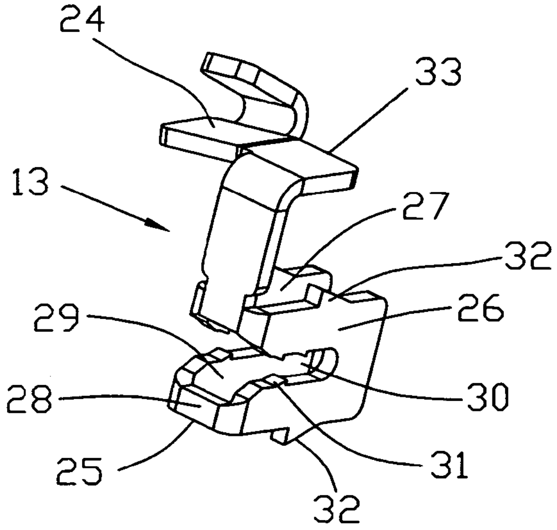
FIG. 5 is a perspective view of a terminal part of a commutator terminal.
Figure 6:
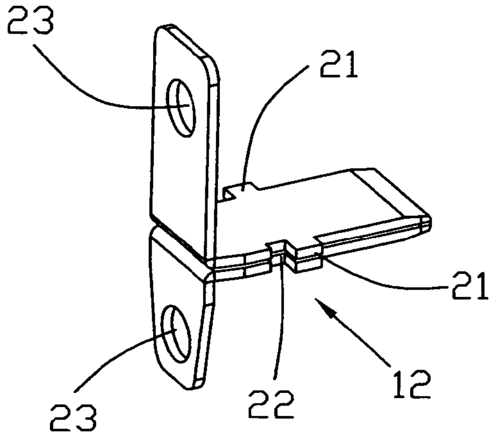
FIG. 6 is a perspective view of a contact part of the commutator terminal.
Figure 7:
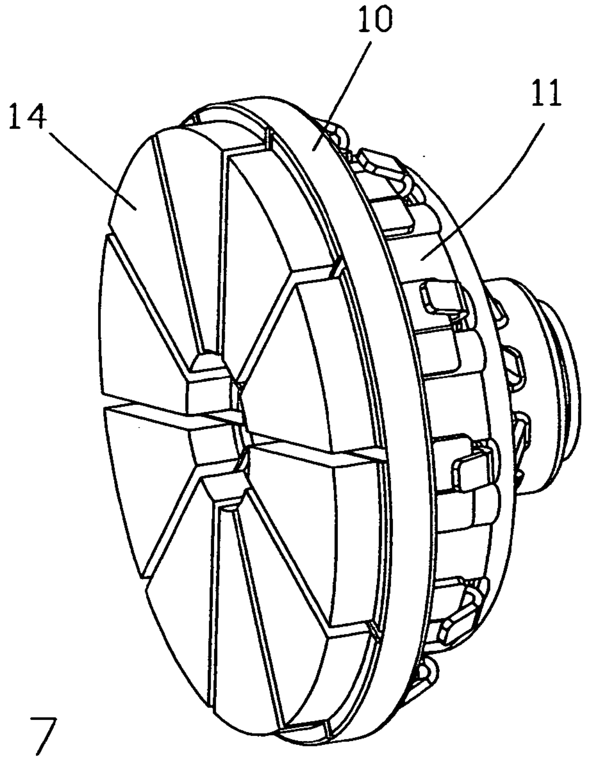
FIG. 7 is a perspective view showing the commutator assembled.

Referring to the drawings, the planar carbon segment commutator shown therein comprises first and second supports 10 and 11, respectively, a plurality of commutator terminals each having a contact part 12 and a separate terminal part 13, and a plurality of carbon segments 14 formed on the first support 10 and over the contact parts 12, respectively, of the commutator terminal.

The first support 10 is in the form of a commutator base of insulating material, typically thermosetting material. The base 10 is of disc-like shape having front and rear surfaces 10*a* and 101, respectively, extending transversely to the rotational axis of the commutator. It has a central hub 15 for receiving the armature shaft (not shown) of an electric motor.

The base 10 also has inner and outer circumferentially extending rows of spaced apart apertures 16 and 17, respectively, and a circumferentially extending row of spaced apart slots 18 which are disposed intermediate the two rows of apertures 16 and 17 and which receive the contact parts 12 of the commutator terminals.

The second support 11 is in the form of a housing of crown-like shape formed of insulating material, typically thermoplastics material, having a central hub 19 for receiving the hub 15 of the base 10 and the shaft (not shown) of the armature. The housing 11 also has a plurality of circumferentially spaced housing recesses 20 (or pockets) for supporting the terminal parts 13, respectively, of the commutator terminals.

Each contact part 12 is formed from an elongate strip of metal folded in two. Lateral projections 21 extend outwardly from opposite sides of each contact part 12 immediately adjacent to laterally extending notches 22 which snap fittably receive end portions of the slots 18. The free ends of the folded contact parts 12 have apertures 23 for a purpose which will become apparent hereinafter.

The contact parts 12 are assembled to the base 10 by pressing the folded contact parts through respective slots 18 until the projections 21, serving as stops, engage with the underside of the base 10 and the notches 22 snap fittably engage with end portions of the slots 18. The two free ends of the contact parts are then bent over so as to lie against, or in close proximity to, the front surface of the base 10.

The carbon segments 14 are then formed on the front surface 10*a* of the commutator base 10 and over the contact parts 12. This may be achieved by hot pressing a disc of green graphite material onto the front surface 10*a* and then cutting the disc into individual segments 14. Green graphite material is a graphite mixture prior to sintering or heat treating during which the binder material is set. During the hot pressing process, the binder is softened (possibly liquefied) and this allows the mixture to flow under pressure into the outer apertures 17 and through the apertures 23 in the contact parts 12 and into the inner apertures 16 to anchor the graphite disc to the base 10. The binder, being of thermoset material such as phenolic resin, once melted and cooled becomes heat resistant, creating a stable contact surface for the commutator. As an alternative to the hot pressing process an over moulding process can be used. In this latter process, the components, namely the commutator base 10 and the contact parts 12, are placed into a mould and graphite material is injected into the mould after the latter has been closed. The hot pressing or moulding process creates a good electrical connection with the contact parts 12.

Each terminal part 13 of the commutator terminals comprises a first portion in the form of a hook-shaped tang 24 to which armature winding wire of a motor can be connected by a thermal connection process such as a fusing process and a second portion 25 of inverted channel-shape for making a mechanical connection with a respective contact part 12. The channel-shaped portion 25 has two sides 26 and 27 and a top 28. The top 28 has a transverse slot 29 merging at opposite ends with open ends of elongate slots 30 extending away from the top 28 and along the two sides 26 and 27 so that a rearwardly projecting portion of a respective contact part 12 can be slidably inserted into the slots 30 in the two sides of the channel-shaped portion 25 of the terminal parts. The elongate edges of the slots 30 have inward projections in the form of barbs 31 for gripping the rearwardly projecting portion of a respective contact part 12 and the channel-shaped portions 25 of the terminal parts have outward projections also in the form of barbs 32 for gripping the walls of the recesses 20.

The hook-shaped tangs 24 are connected to respective channel-shaped portions 25 by intermediate portions 33 in part serving as shoulders which rest against the outer peripheral surface of the crown-like housing 11. Recesses 34 are provided in the crown-shaped housing 11 behind the hook-shaped tangs 24 so that a supporting stem (not shown) of high temperature resistivity, e.g. thermosetting material or metal, can be placed in the recess during magnet wire fusing. The contact between the intermediate portions 33 and the peripheral surface of the crown-like housing 11 avoids bending of the tangs 24 during the fusing process. Posts 35 projecting rearwardly from the rear surface of the commutator base 10 fill the recesses 34 when the commutator has been fully assembled.

Ribs 36 on the rear surface of the crown-like housing 11 strengthen the housing 11 during assembly and orientation pillars 37 are spaced apart around the outer periphery of the hub 15 of the base 10 for location in corresponding slots 38 in the hub 19 of the housing 11 in order to orientate the base 10 and housing 111 with respect to one another during assembly.

The base 10, together with the contact parts 12 and the carbon segments 14, and the housing 11, together with the terminal parts 13, are first assembled. The housing 11 is then slid onto an armature shaft of a motor and the armature winding is wound about an insulated lamination stack. The winding is then fused to the tangs 24 prior to sliding the base 10 onto the armature shaft and connecting the contact parts 12 to the terminal parts 13.

This means that the heat generated by fusing the winding wire to the tangs 24 is not transferred to the connection between the graphite and contact parts and that the need to provide a range of different commutator terminals to connect to the different wire diameters used is avoided.

Although it is preferred to fuse the winding to the tangs 24 prior to connecting the contact parts 12 to the terminal parts 13, it would be possible to connect the contact parts 12 to the terminal parts 13 and then subsequently fuse the winding to the tangs 24 as the tangs 24 are relatively far away from the carbon segments and more or less thermally de-coupled due to the two part terminal construction.

Thermal connection processes other than a fusing process can be used to connect the armature winding wire to the tangs 24. For example, the winding wire could be connected to the tangs 24 by conventional soldering or by laser welding/laser soldering.

The embodiments described above are given by way of example only and various modifications will be apparent to persons skilled in the art without departing from the scope of the invention as defined by the appended claims. For example, the invention could also be applicable to a cylindrical carbon segment commutator as well as to a planar carbon segment commutator.

The invention claimed is:

1. A commutator in the form of a planar commutator having a planar commutating surface comprising a plurality of commutator terminals each having a contact part and a separate terminal part, first and second supports of insulating material for supporting the contact parts and the terminal parts, respectively, wherein the first support is in the form of a commutator base of insulating material, the base having a rotational axis and front and rear surfaces extending, at least in part, transversely to the rotational axis, wherein the contact parts extend through respective apertures in the base and are bent over to lie against, or in close proximity to, the front surface of the base, and wherein rearwardly extending portions of the contact parts make a mechanical connection with respective terminal parts, and a plurality of carbon segments formed on the first support and over the contact parts, respectively, of the terminals, the terminal parts each comprising a first portion to which armature winding wire of a motor can be connected by a thermal connection process and a second portion for making a mechanical connection with a respective contact part.

2. The commutator of claim 1, wherein the second portion of each terminal part has at least one elongate slot for slidably receiving a portion of a respective contact part.

3. The commutator of claim 2, wherein the second portion of each terminal part is of inverted channel-shape with two sides and a top, the top having a transverse slot merging at opposite ends with open ends of elongate slots extending away from the top and along the two sides so that the said portion of a respective contact part can be slidably inserted into the slots in the two sides of the second portion of the terminal part.

4. A commutator comprising a plurality of commutator terminals each having a contact part and a separate terminal part, first and second supports of insulating material for supporting the contact parts and the terminal parts, respectively, and a plurality of carbon segments formed on the first support and over the contact parts, respectively, of the terminals, the terminal parts each comprising a first portion to which armature winding wire of a motor can be connected by a thermal connection process and a second portion for making a mechanical connection with a respective contact part, wherein the second portion of each terminal part has at least one elongate slot for slidably receiving a portion of a respective contact part, wherein the second portion of each terminal part is of inverted channel-shape with two sides and a top, the top having a transverse slot merging at opposite ends with open ends of elongate slots extending away from the top and along the two sides so that the said portion of a respective contact part can be slidably inserted into the slots in the two sides of the second portion of the terminal part, and wherein elongate edges of the slots have inward projections for gripping the said portion of a respective contact part.

5. The commutator of claim 1, wherein the second support is in the form of a housing having a plurality of housing recesses for receiving the second portions of the terminal parts, respectively.

6. The commutator of claim 5, wherein the second portions of the terminal parts have outward projections for gripping the walls of the recesses.

7. The commutator of claim 1, wherein the first portions of the terminal parts are in the form of hook-shaped tangs connected to respective second portions by intermediate portions.

8. The commutator of claim 7, wherein the intermediate portions at least in part lie against an outer peripheral surface of the housing.

9. A commutator comprising a plurality of commutator terminals each having a contact part and a separate terminal part, first and second supports of insulating material for supporting the contact parts and the terminal parts, respectively, and a plurality of carbon segments formed on the first support and over the contact parts, respectively, of the terminals, the terminal parts each comprising a first portion to which armature winding wire of a motor can be connected by a thermal connection process and a second portion for making a mechanical connection with a respective contact part, wherein the first portions of the terminal parts are in the form of hook-shaped tangs connected to respective second portions by intermediate portions, and wherein recesses are provided in the housing behind the hook-shaped tangs.

10. The commutator of claim 9, wherein the plurality of carbon segments form a planar commutating surface, wherein the first support is in the form of a commutator base of insulating material, the base having a rotational axis and front and rear surfaces extending, at least in part, transversely to the rotational axis, and wherein the contact parts extend through respective apertures in the base and are bent over to lie against, or in close proximity to, the front surface of the base.

11. The commutator of claim 10, wherein the commutator base has posts projecting from its rear surface to fit in the recesses behind the hook-shaped tangs.

12. An electric motor having the commutator of claim 1.

* * * * *